No. 646,429. Patented Apr. 3, 1900.
R. HARDIE.
CUT-OFF VALVE GEAR.
(Application filed Apr. 3, 1899.)
(No Model.) 2 Sheets—Sheet 1.
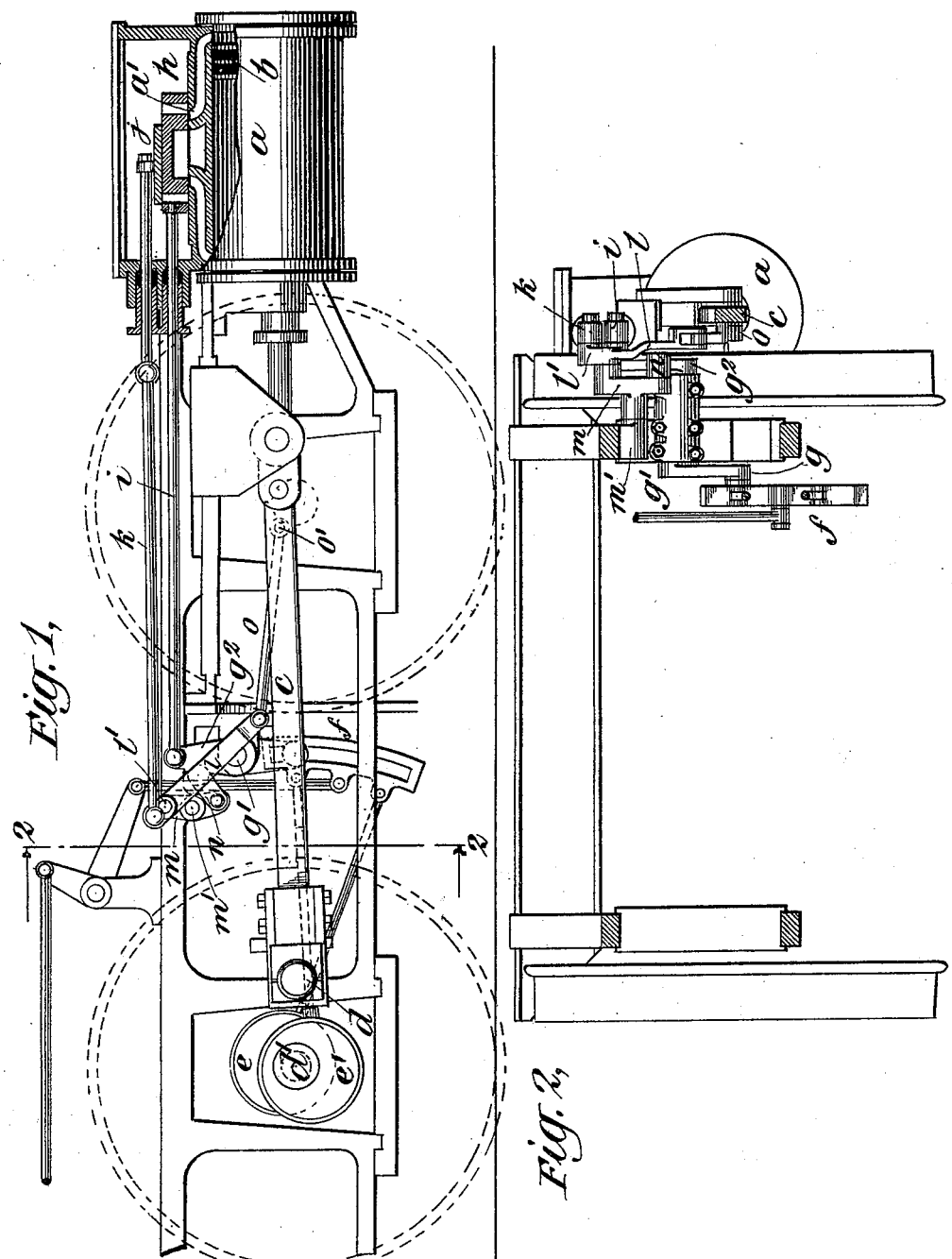
WITNESSES:
INVENTOR
Robert Hardie
BY
ATTORNEY

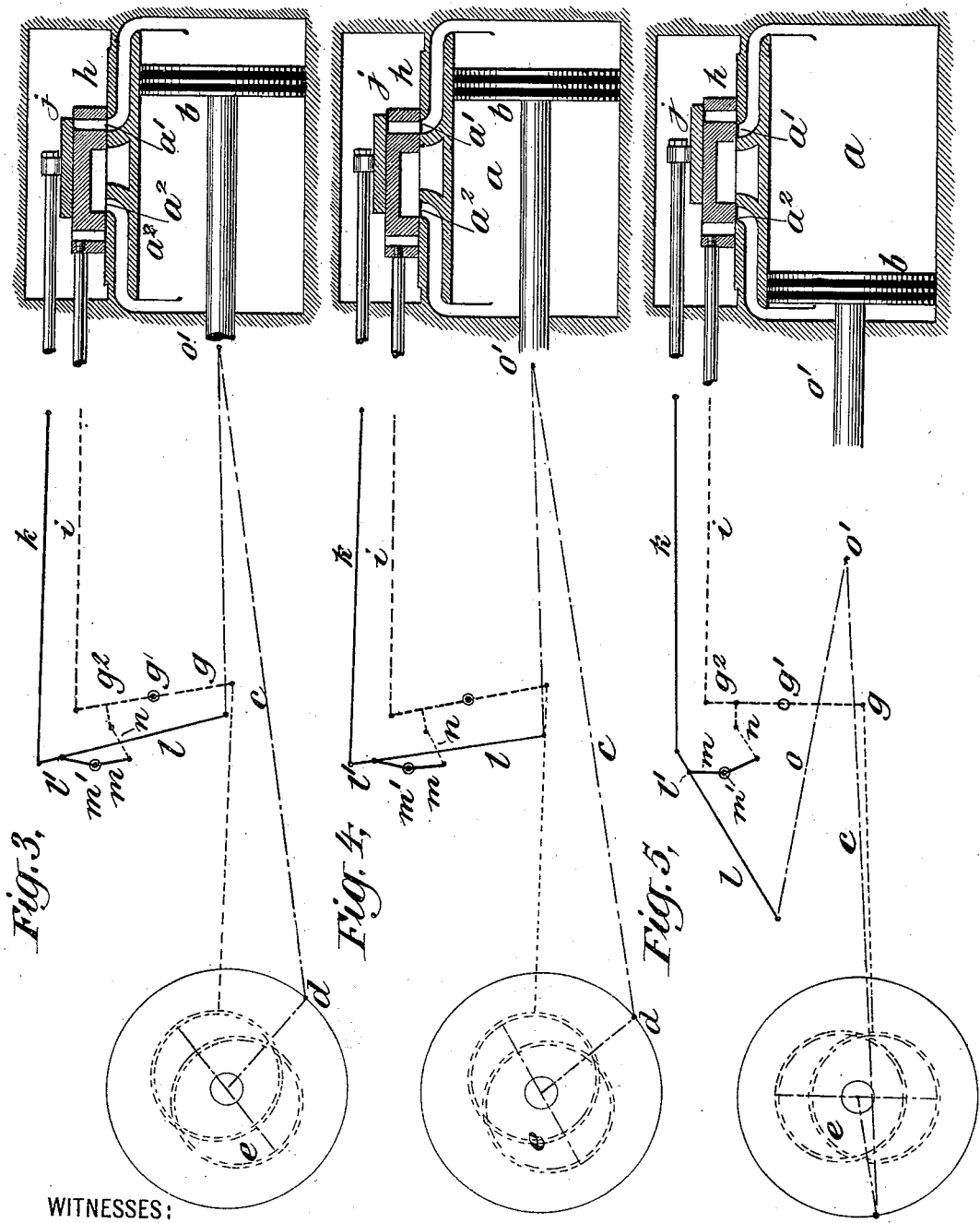

UNITED STATES PATENT OFFICE.

ROBERT HARDIE, OF CHICAGO, ILLINOIS.

CUT-OFF-VALVE GEAR.

SPECIFICATION forming part of Letters Patent No. 646,429, dated April 3, 1900.

Application filed April 3, 1899. Serial No. 711,505. (No model.)

*To all whom it may concern:*

Be it known that I, ROBERT HARDIE, a citizen of the United States, and a resident of Chicago, in the county of Cook and State of Illinois, have invented certain new and useful Improvements in Cut-Off-Valve Gear, of which the following is a specification.

The cut-off-valve gear forming the subject of this invention is designed for use in that class of fluid-pressure-distributing devices for motors actuated by steam or other fluid under pressure where a cut-off slide-valve is arranged to operate in conjunction with a main slide-valve.

The object of this invention is the construction of a simple, efficient, and positively-actuated valve-gear that will cause the cut-off valve to promptly close the inlet-port openings of the main valve at the desired and predetermined point of cut-off.

The invention consists of the addition to the main slide-valve and its operating-gear of a cut-off slide-valve arranged to slide on the back of the main valve and an operating-gear therefor, as levers and connecting-rods, so connected to and under the influences of the moving part of the engine connected to or working in unison with the piston and the main-valve-operating gear, whereby a movement is imparted to the cut-off valve that partakes of the combined movements of the piston and main valve and is variable in relation to both of the movements of the piston and main valve.

My improved cut-off-valve gear is adapted for use in any style of prime mover having a main slide or distributing valve and actuated by a fluid under pressure.

In the drawings forming part of this specification the said valve-gear is shown applied to a locomotive, in which drawings—

Figure 1 represents in side elevation a part of the engine-frame of a locomotive and the engine provided with my improved cut-off-valve gear. Fig. 2 is a transverse section of the same, taken on the line 2 2, Fig. 1; and Figs. 3, 4, and 5 are diagrams illustrating the relative positions of the cut-off and main valves for three angular positions of the crank of the engine.

The proportions and arrangement of the various parts of the devices as shown in the drawings and here described are selected for demonstrative purposes and are not necessarily to be strictly followed in all applications of my improvements. Variations and modifications will readily suggest themselves to the engineer in applying my invention to meet particular cases.

The main portions of the engine shown, it will be observed, are of the ordinary construction, comprising a cylinder $a$, a piston $b$, a connecting-rod $c$, a crank $d$ on the driving-shaft $d'$, and two eccentrics $e$ $e$, also on the shaft $d'$ and connected by their rod to the link $f$. This link $f$ embraces the end of the inner arm $g$, secured to the rock-shaft $g'$, and is controlled and actuated by the lever and rod $f'$, so as to enable the different parts of the link $f$ to be set on the end of the arm $g$. The main valve $h$ by its rod $i$ is connected to the end of the outer arm $g^2$, which is secured to the rock-shaft $g'$ in the ordinary way.

The cut-off valve $j$ is shown as a flat plate resting on the upper surface or back of the main valve $h$ and is connected by the rod $k$ to the upper end of the lever $l$, the fulcrum $l'$ or pivotal connection of which is carried by the upper arm of the lever $m$, whose central rock-shaft $m'$ has a bearing formed in the engine-frame or in a bracket secured to the engine-frame. The lower arm of this lever $m$ is by the link $n$ connected to the outer arm $g^2$, which imparts motion from the link $f$ to the main slide-valve $h$. To impart motion to the cut-off valve $j$ through the medium of the lever $l$, the lower end of said lever is connected to some suitable moving part of the engine that travels in unison with the piston $b$, said connection, as shown in the drawings, being made by the rod $o$, joined at one end to the lower end of the lever $l$ and at its other end $o'$ to the main connecting-rod $c$ near its point of attachment to the cross-head of the engine. It will be observed that the lever $l$ is a floating lever, for while its lower end moves coincidently with the piston $b$ its fulcrum $l'$ has no fixed location of action, its position being variable and controlled by the means that conveys movement to the main valve $h$ from the eccentrics $e$ $e$, so that the cut-off valve $j$, which receives its motion from the upper end of the lever $l$, will have imparted to it a compound movement, which is variable both as to the movement of the piston and as to the movement of the main valve, as its rod $k$ is rocked through an arc the center of which is the fulcrum $l'$ of the lever $l$, and this fulcrum is at the same time moved through an arc whose center is $m'$ of the rocking lever $m$.

To clearly show the operation of and function performed by this improved cut-off-valve gear, it is illustrated in different positions in the several views of the drawings. With the particular proportions and arrangements of parts here selected Fig. 1 shows the crank $d$ on the dead-center. The port $a'$, which is now the inlet-port of the cylinder, is uncovered by the valve $h$ sufficiently for a free flow of motive agent to the cylinder, the edge of the cut-off valve being at about its full clearance from the leading edge of the opening through the main valve. Now when the crank $d$ has made an angular movement of forty degrees, as shown at Fig. 3, the piston then being at about one-eighth stroke, the cut-off valve $j$ has closed the opening of the main valve $h$, the port of this valve being then at about full opening with the inlet-port $a'$ of the cylinder. Thus the motive agent is in this particular case cut off at about one-eighth stroke, and said cut-off occurs quickly and sharply, as a long movement between the main and cut-off valves has taken place, while the piston has moved a relatively-short distance, the movement of the two valves being in opposite directions. Another ten-degree movement of the crank $d$ or when it is at an angle of fifty degrees, as shown at Fig. 4, brings the main valve $h$ to about the limit of its movement in an outwardly direction or a movement coincident with that of the piston, the cut-off valve then having considerable lap over the port-openings of the main valve and the main-valve port-opening being fully exposed to the inlet-port $a'$ of the cylinder, the piston now being at a little less than one-fifth stroke. The motive agent is now working expansively, and it continues so to do for the remainder of the piston-stroke. Fig. 5 shows the relative positions of various parts of the engine when the crank has made an angular movement of one hundred and seventy degrees, the main valve $h$ then slightly lapping the port $a'$, the cut-off valve still closing the main-valve port-opening, as it has continued to do throughout the whole outward movement of the piston. The next movement of ten degrees of the crank will bring the piston to the end of the stroke, the other main-valve port-opening then being exposed to the port $a^2$ at the other end of the cylinder. The forward ends of both valves now bear the same relation to this end of the cylinder as their other ends did to the other end of the cylinder when the crank was on the other dead-center, as shown at Fig. 1. The movement of the valves relatively to that of the inward travel of the piston is now similar to their movement during the outward travel of the piston, as first described.

As the travel of the main valve is reduced by setting the link $f$ to act on the arm $g$ at points nearer the center of the link, the throw or travel of the cut-off valve $j$ is commensurately varied by the reduced movement of the fulcrum $l'$ of the lever $l$, and the cut-off occurs later; but the positive and quick action of the cut-off valve maintains for all active positions in which the parts of the engine may be adjusted.

I claim as my invention—

1. In an engine, in combination, a cylinder and piston, a main slide-valve, means for actuating the main slide-valve from the movement of the piston, a cut-off slide-valve arranged to act in conjunction with the main slide-valve, a lever directly connected at one end to the cut-off valve and connected at its other end to a moving part of the engine acting in unison with the piston, and an arm to which the fulcrum of the lever is connected, and which is connected to and rocked by the means actuating the main valve, in opposition to the movement of the main valve, whereby the speed of the cut-off is auxiliated.

2. A cut-off-valve gear combined with an engine having a cylinder, piston, connecting-rod, crank-shaft and crank, main slide-valve, a rocking arm connected to the main valve, a link-motion for imparting movement from the crank-shaft to the rocking arm, said valve-gear comprising a floating lever directly connected at its upper end to the cut-off valve, a pivotal arm on which the floating lever has its fulcrum, connection between the pivotal arm and the rocking arm of the main valve, whereby the floating-lever fulcrum on the pivotal arm is caused to move in opposition to the main valve, and connection between the lower end of the floating lever and one of the parts connected to and moving coincidently with the piston.

Signed at Rome, in the county of Oneida and State of New York, this 29th day of March, A. D. 1899.

ROBERT HARDIE.

Witnesses:
 GEO. D. LITTLE,
 S. A. DOHN.